(12) United States Patent
Bloms et al.

(10) Patent No.: US 7,077,082 B2
(45) Date of Patent: Jul. 18, 2006

(54) SYSTEM AND METHOD FOR MONITORING ENGINE VALVE ACTUATION

(75) Inventors: Jason Kenneth Bloms, Peoria, IL (US); Steven J. Funke, Mapleton, IL (US); Robert A. Kagy, Peoria, IL (US); Evan E. Jacobson, Peoria, IL (US)

(73) Assignee: Caterpillar, Inc., Peoria, IL (US)

( * ) Notice: Subject to any disclaimer, the term of this patent is extended or adjusted under 35 U.S.C. 154(b) by 75 days.

(21) Appl. No.: 10/309,317

(22) Filed: Dec. 4, 2002

(65) Prior Publication Data

US 2003/0213445 A1 Nov. 20, 2003

Related U.S. Application Data

(63) Continuation-in-part of application No. 10/144,065, filed on May 14, 2002.

(51) Int. Cl.
*F01L 9/02* (2006.01)

(52) U.S. Cl. .................. 123/90.12; 123/90.15; 123/320; 123/90.16

(58) Field of Classification Search ............. 123/90.12, 123/90.15, 90.16, 90.17, 90.18, 320, 321, 123/322

See application file for complete search history.

(56) References Cited

U.S. PATENT DOCUMENTS

| | | |
|---|---|---|
| 3,250,068 A | 5/1966 | Villamy |
| 4,227,494 A | 10/1980 | Uitvlugt |
| 4,424,790 A | 1/1984 | Curtil |
| 4,561,253 A | 12/1985 | Curtil |
| 4,726,332 A | 2/1988 | Nishimura et al. |
| 4,742,806 A | 5/1988 | Tart et al. |
| 4,815,423 A | 3/1989 | Holmer |

(Continued)

FOREIGN PATENT DOCUMENTS

| | | |
|---|---|---|
| JP | 05106415 A2 | 4/1993 |
| JP | 2000120457 A | 4/2000 |
| JP | 2000145484 A | 5/2000 |
| WO | WO 98/02653 | 1/1998 |

OTHER PUBLICATIONS

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23–26, 1998, pp. 1–19.

(Continued)

*Primary Examiner*—Thomas Denion
*Assistant Examiner*—Kyle M. Riddle
(74) *Attorney, Agent, or Firm*—Finnegan, Henderson, Farabow, Garrett & Dunner, LLP

(57) ABSTRACT

An engine valve actuation system is provided. An intake valve is moveable between a first position where the intake valve prevents a flow of fluid relative to the intake valve and a second position where the intake valve allows a flow of fluid relative to the intake valve. A cam assembly is configured to move the intake valve between the first position and the second position. A fluid actuator having a chamber is adapted to selectively prevent the intake valve from moving to the first position. A fluid supply system is adapted to deliver fluid to the chamber of the fluid actuator. A pressure sensor is operatively engaged with the fluid supply system and is adapted to sense the pressure of the fluid within the fluid supply system. A controller is adapted to receive the sensed pressure of the fluid within the fluid supply system, to determine an expected pressure of the fluid within the fluid supply system, to identify when the sensed pressure deviates from the expected pressure, and to generate a responsive fault signal.

52 Claims, 7 Drawing Sheets

U.S. PATENT DOCUMENTS

| | | | |
|---|---|---|---|
| 4,869,222 A | | 9/1989 | Klassen |
| 4,996,954 A | | 3/1991 | Seki et al. |
| 5,042,437 A | | 8/1991 | Sakuragi et al. |
| 5,220,899 A | * | 6/1993 | Ikebe et al. ............... 123/531 |
| 5,408,979 A | | 4/1995 | Backlund et al. |
| 5,445,128 A | | 8/1995 | Letang et al. |
| 5,494,008 A | * | 2/1996 | Ohkawa et al. .......... 123/90.17 |
| 5,544,626 A | | 8/1996 | Diggs et al. |
| 5,576,963 A | | 11/1996 | Ribbens et al. |
| 5,682,854 A | | 11/1997 | Ozawa |
| 5,697,333 A | | 12/1997 | Church et al. |
| 5,730,102 A | | 3/1998 | Arnold et al. |
| 5,787,855 A | | 8/1998 | Mueller et al. |
| 5,816,216 A | | 10/1998 | Egashira et al. |
| 5,908,015 A | | 6/1999 | Kreuter |
| 5,927,075 A | | 7/1999 | Khair |
| 5,992,390 A | | 11/1999 | Moyer |
| 6,021,758 A | | 2/2000 | Carey et al. |
| 6,026,786 A | | 2/2000 | Groff et al. |
| 6,082,328 A | | 7/2000 | Meistrick et al. |
| 6,138,620 A | * | 10/2000 | Nemoto et al. .......... 123/90.11 |
| 6,170,441 B1 | | 1/2001 | Haldeman et al. |
| 6,196,197 B1 | * | 3/2001 | Yamada et al. ............. 123/480 |
| 6,209,516 B1 | | 4/2001 | Yamashita |
| 6,237,551 B1 | | 5/2001 | Macor et al. |
| 6,267,107 B1 | | 7/2001 | Ward |
| 6,273,076 B1 | | 8/2001 | Beck et al. |
| 6,279,550 B1 | | 8/2001 | Bryant |
| 6,301,887 B1 | | 10/2001 | Gorel et al. |
| 6,301,889 B1 | | 10/2001 | Gladden et al. |
| 6,302,076 B1 | | 10/2001 | Bredy |
| 6,390,041 B1 | | 5/2002 | Nakamura et al. |
| 6,460,337 B1 | | 10/2002 | Olofsson |
| 6,467,452 B1 | | 10/2002 | Duffy et al. |
| 6,571,765 B1 | | 6/2003 | Kuboshima et al. |
| 6,651,618 B1 | | 11/2003 | Coleman et al. |
| 6,688,280 B1 | | 2/2004 | Weber et al. |
| 2002/0179027 A1 | | 12/2002 | Jankovic et al. |

OTHER PUBLICATIONS

Obert, "Internal Combustion Engines and Air Pollution," Based on Internal Combustion Engines, Third Edition, 1973, pp. 612–614.

Challen et al., "Diesel Engine Reference Book, Section Edition," SAE International, 1999, pp. 75, 81, 84, 146, and 263–305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146–150.

Request for *Inter Partes* Reexamination Transmittal Form for U.S. Pat. 6,688,280, and Attachment to Request for Inter Parties Reexamination Transmittal Form, Sep. 17, 2004..

Request for *Inter Partes* Reexamination Transmittal Form for U.S. Pat. 6,651,618, and Attachment to Request for Inter Parties Reexamination Transmittal Form, Aug. 27, 2004.

http://www.mazda.com.au/corpora/209.html, Oct. 16, 2001, pp. 1–6.

* cited by examiner

SYSTEM AND METHOD FOR MONITORING ENGINE VALVE ACTUATION

RELATED APPLICATIONS

This application is a continuation-in-part application Ser. No. 10/144,065 filed on May 14, 2002 for Engine Valve Actuation System and Method.

TECHNICAL FIELD

The present invention is directed to a system and method for monitoring the actuation of an engine valve and, more particularly, to a system and method for monitoring the actuation of an engine valve in an internal combustion engine.

BACKGROUND

An internal combustion engine, such as, for example, a diesel, gasoline, or natural gas engine, typically includes a series of intake and exhaust valves. These valves may be actuated, or selectively opened and closed, to control the amount of intake and exhaust gases that flow to and from the combustion chambers of the engine. Typically, the actuation of the engine valves is timed to coincide with the reciprocating movement of a series of pistons. For example, the intake valves associated with a particular combustion chamber may be opened when the respective piston is moving through an intake stroke. The exhaust valves associated with the particular combustion chamber may be opened when the respective piston is moving through an exhaust stroke.

The combustion process of an internal combustion engine may generate undesirable emissions, such as, for example, particulates and oxides of nitrogen (NOx). These emissions are generated when a fuel, such as, for example, diesel, gasoline, or natural gas, is combusted within the combustion chambers of the engine. If no emission reduction systems are in place, the engine will exhaust these undesirable emissions to the environment.

An engine may include many different types of emission reduction systems to reduce the amount of emissions exhausted to the environment. For example, the engine may include an engine gas recirculation system and/or an after-treatment system. Unfortunately, while these emission reduction systems may effectively reduce the amount of emissions exhausted to the environment, these systems typically result in a decrease in the efficiency of the engine.

Efforts are currently being focused on improving engine efficiency to counterbalance the effect of emission reduction systems. One such approach to improving engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551, a "late intake" Miller cycle may be implemented in such a cam arrangement by modifying the shape of the cam to overlap the actuation of the intake valve with the start of the compression stroke of the piston.

One problem with implementing a Miller cycle in an engine is that the resulting reduced air flow and compression ratio may negatively impact the performance of the engine under certain operating conditions, such as, for example, when the engine is starting or operating under heavy loads. In these types of conditions, engine performance may be enhanced by switching the operation of the engine to a convention diesel cycle. This may be accomplished with a variable valve actuation system, such as the system described in U.S. Pat. No. 6,237,551. As described, the variable valve actuation system may include a valve that is operable to selectively enable and disable a Miller cycle.

While the selective enabling of a Miller cycle may improve the performance of an engine, the operation of the variable valve actuation system should be monitored to prevent damage to the engine. A failure of one or more components in the variable valve actuation system may result in one or more cylinders operating continuously in a conventional diesel cycle or in one of the engine valves remaining in an open position. Without detection of such a failure, the continued operation of the engine may result in damage to one or more of the engine components.

The system and method of the present invention solves one or more of the problems set forth above.

SUMMARY OF THE INVENTION

One aspect of the present invention is directed to an engine valve actuation system. An intake valve is moveable between a first position where the intake valve prevents a flow of fluid relative to the intake valve and a second position where the intake valve allows a flow of fluid relative to the intake valve. A cam assembly is configured to move the intake valve between the first position and the second position. A fluid actuator having a chamber is adapted to selectively prevent the intake valve from moving to the first position. A fluid supply system is adapted to deliver fluid to the chamber of the fluid actuator. A pressure sensor is operatively engaged with the fluid supply system and is adapted to sense the pressure of the fluid within the fluid supply system. A controller is adapted to receive the sensed pressure of the fluid within the fluid supply system, to determine an expected pressure of the fluid within the fluid supply system, to identify when the sensed pressure deviates from the expected pressure, and to generate a responsive fault signal.

In another aspect, the present invention is directed to a method of controlling an engine valve. A cam assembly is operated to move an intake valve between a first position where the intake valve prevents a flow of fluid and a second position where the intake valve allows a flow of fluid. Fluid is provided through a fluid supply system to a fluid actuator to selectively prevent the intake valve from moving to the second position. A pressure of the fluid within the fluid supply system is sensed. An expected pressure of the fluid within the fluid supply system is determined. An identification is made when the sensed pressure of the fluid within the fluid supply system deviates from the expected pressure of the fluid within the fluid supply system. A fault signal is generated when the sensed pressure deviates from the expected pressure for a predetermined period of time.

DETAILED DESCRIPTION

Figure 1:
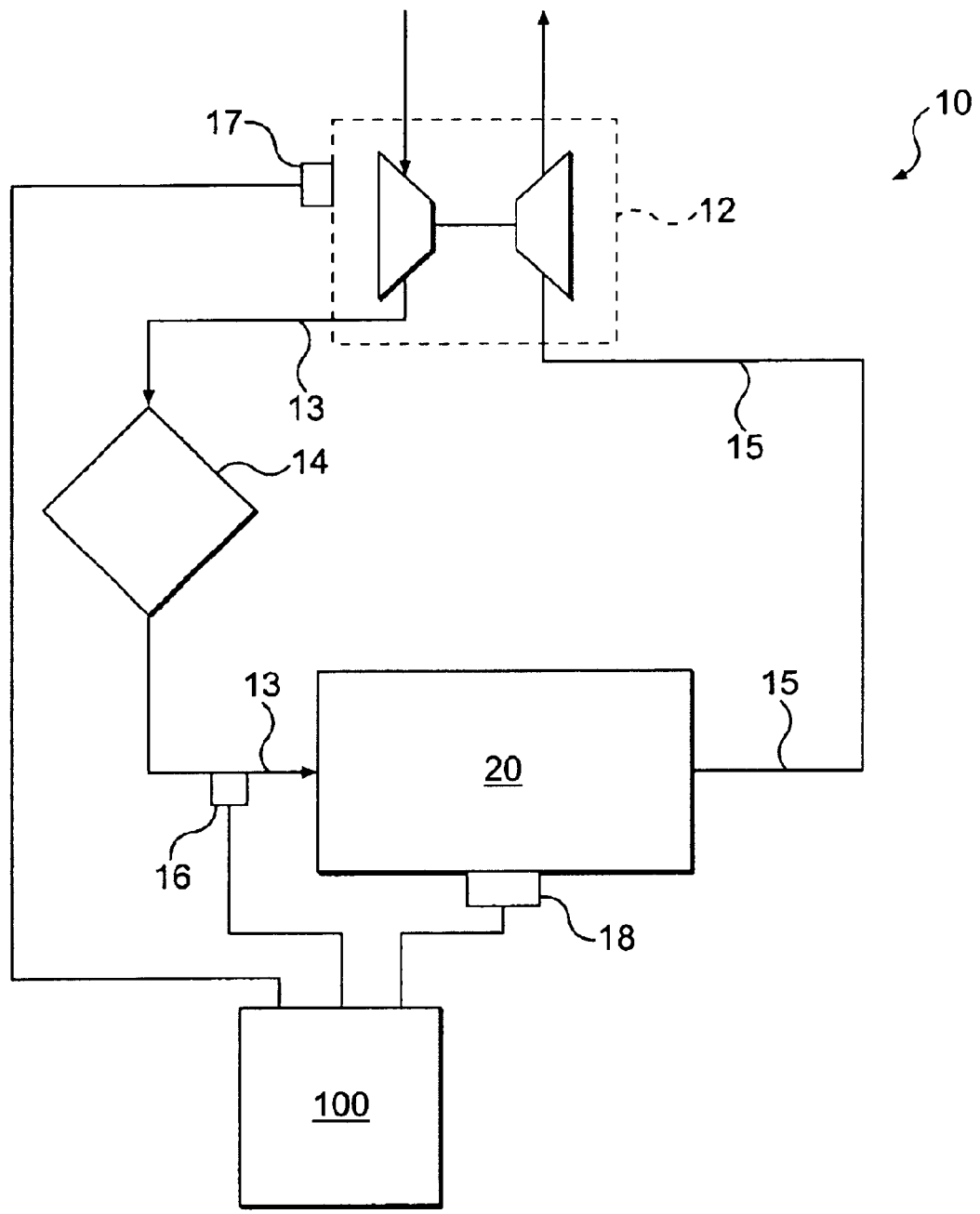
FIG. 1 is a diagrammatic and schematic representation of an engine system in accordance with an exemplary embodiment of the present invention.

An exemplary embodiment of an engine system 10 is illustrated in FIG. 1. Engine system 10 includes an intake air passageway 13 that leads to an engine 20. One skilled in the art will recognize that engine system 10 may include various components, such as, for example, a turbocharger 12 and an aftercooler 14, that are disposed in intake air passageway 13. An exhaust air passageway 15 may lead from engine 20 to turbocharger 12.

Figure 2:
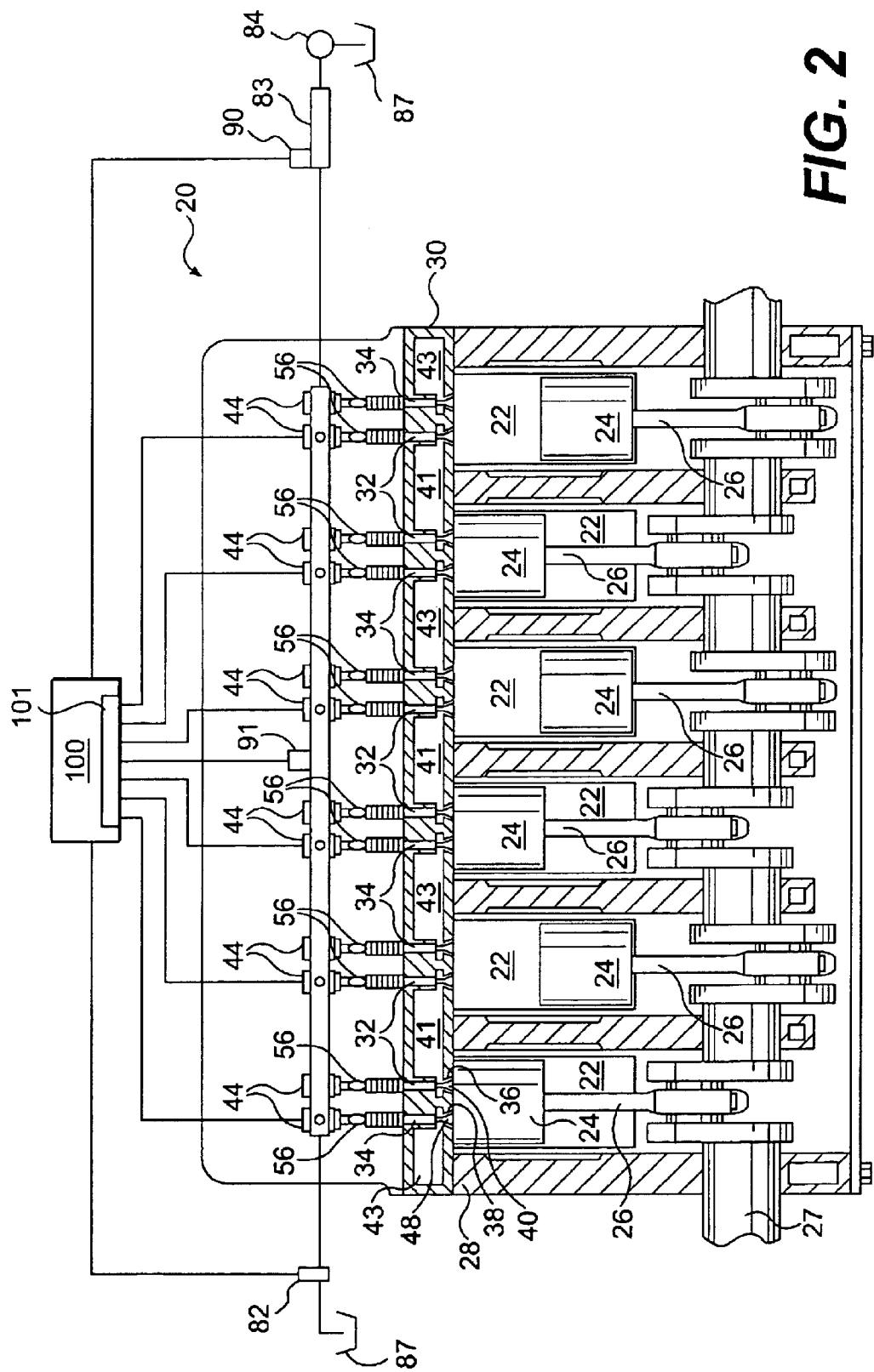
FIG. 2 is a diagrammatic cross-sectional view of an internal combustion engine in accordance with an exemplary embodiment of the present invention.

Engine 20 may be an internal combustion engine as illustrated in FIG. 2. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 2, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" or "V" type configuration.

As also shown in FIG. 2, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will cause a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 3:
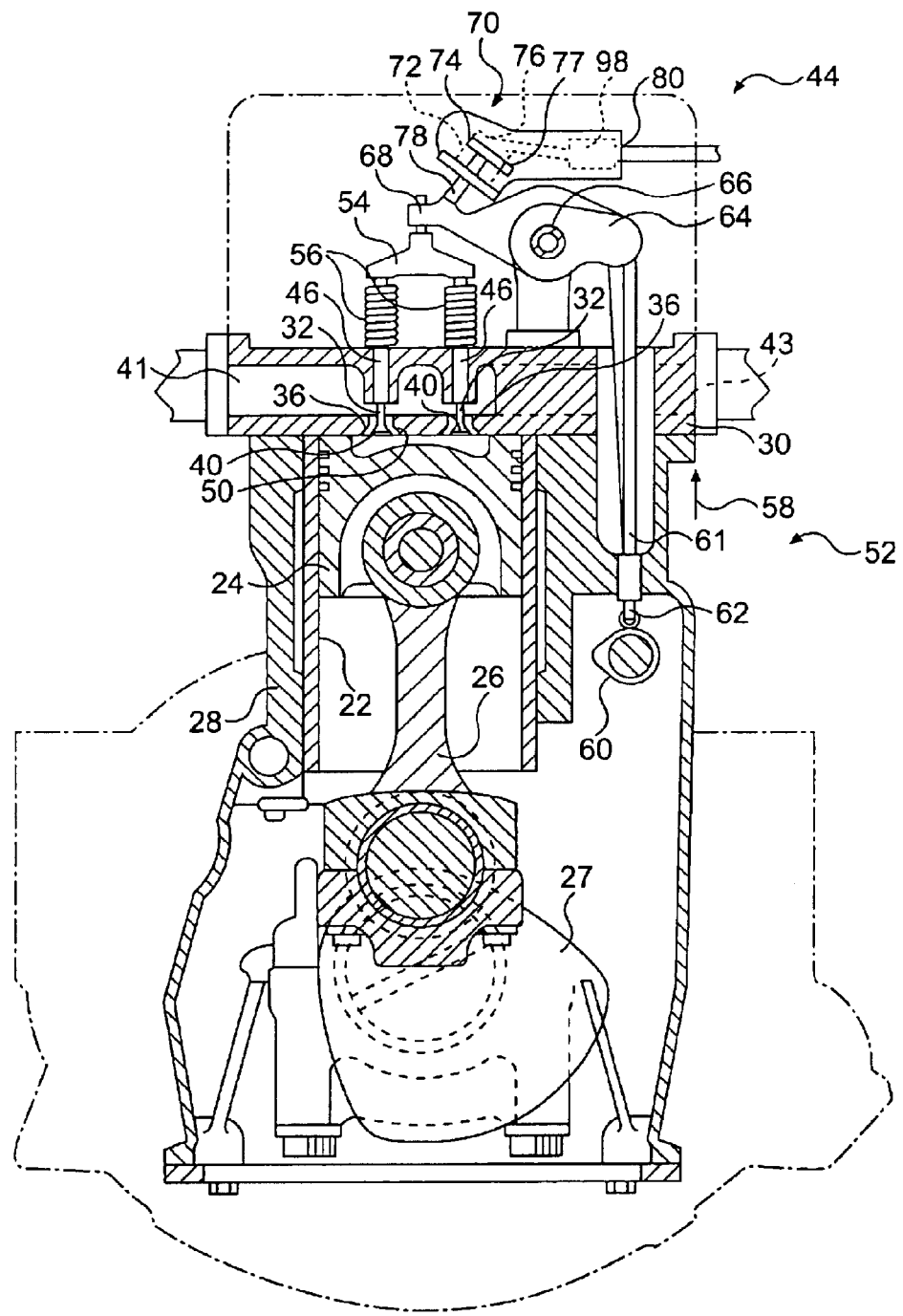
FIG. 3 is a diagrammatic cross-sectional view of a cylinder and valve actuation assembly in accordance with an exemplary embodiment of the present invention.

FIG. 3 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and blocks fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 2) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As also shown in FIG. 2, a series of valve actuation assemblies 44 are operatively associated with each intake valve 32 and exhaust valve 34. Each valve actuation assembly 44 is operable to open or "lift" the associated intake valve 32 or exhaust valve 34. In the following exemplary description, valve actuation assembly 44 is driven by a combination of a cam assembly 52 and a fluid actuator 70. One skilled in the art will recognize, however, that valve actuation assembly 44 may be driven by through other types of systems, such as, for example, a hydraulic actuation system, an electronic solenoid system, or any combination thereof.

In the exemplary embodiment of FIG. 3, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 3, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is withdrawing within cylinder 22 to allow air to flow from intake passageway 41 into cylinder 22.

A similar valve actuation assembly 44 may be connected to exhaust valves 34. A second cam (not shown) may be connected to crankshaft 27 to control the actuation timing of exhaust valves 34. Exhaust valves 34 may be actuated to open exhaust ports 38 when piston 24 is advancing within cylinder 22 to allow exhaust to flow from cylinder 22 into exhaust passageway 43.

As shown in FIG. 3, valve actuation assembly 44 also includes a fluid actuator 70. Fluid actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64. Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 4:
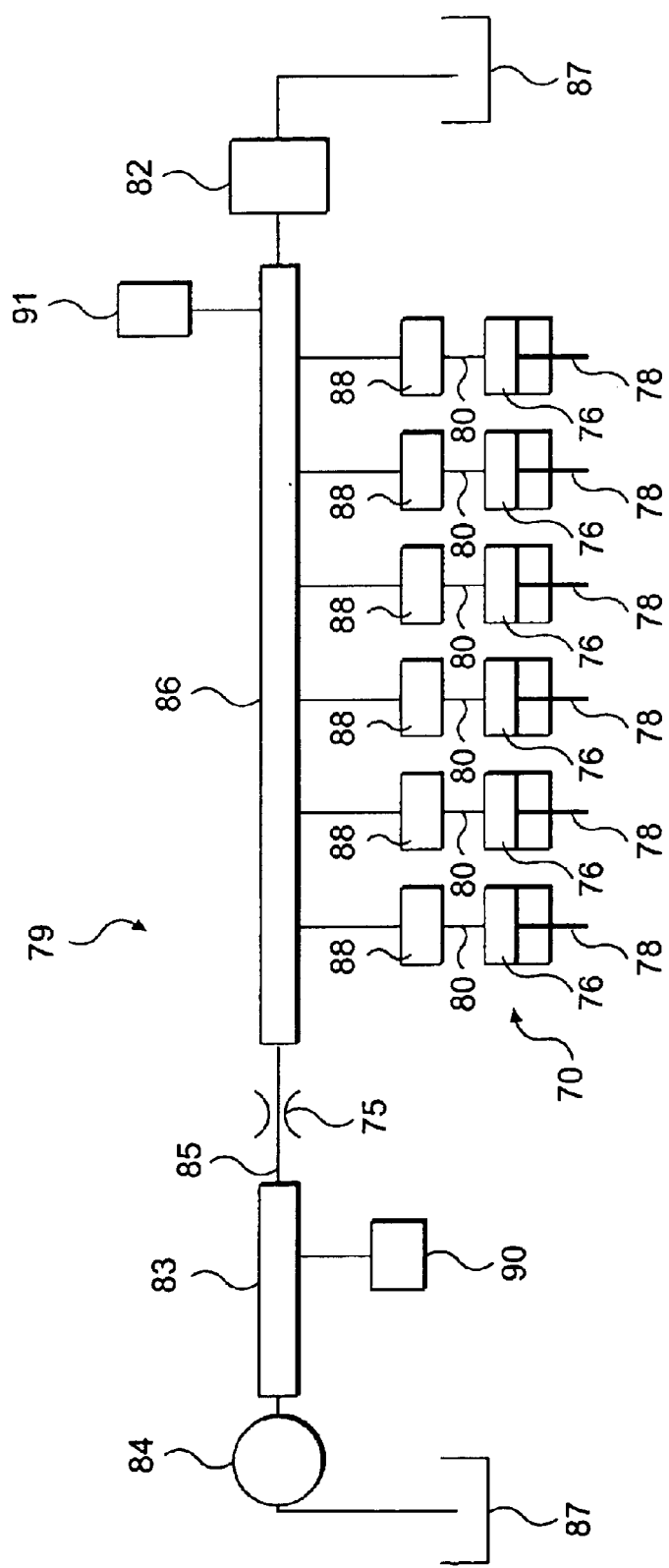
FIG. 4 is a schematic and diagrammatic representation of a fluid supply system for a fluid actuator for an engine valve in accordance with an exemplary embodiment of the present invention.

As illustrated in FIGS. 2 and 4, engine system 10 may include a source of fluid 84 to draw fluid from a tank 87 that holds a supply of fluid, which may be, for example, a hydraulic fluid, a lubricating oil, a transmission fluid, or fuel. Source of fluid 84 may increase the pressure of the fluid and direct the fluid into a main gallery 83. Source of fluid 84 and main gallery 83 may be part of a lubrication system, such as typically accompanies an internal combustion engine. Main gallery 83 may contain pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

As shown in FIG. 4, a fluid supply system 79 connects main gallery 83 with fluid actuator 70. A restrictive orifice 75 may be positioned in fluid line 85 between main gallery 83 and a first end of fluid rail 86. A control valve 82 may be connected to an opposite end of fluid rail 86 and lead to tank 87. Control valve 82 may be opened to allow a flow of fluid through restrictive orifice 75 and fluid rail 86 to tank 87. Control valve 82 may be closed to allow a build up of pressure in the fluid within fluid rail 86.

As illustrated in FIG. 4, fluid rail 86 supplies pressurized fluid to a series of fluid actuators 70. Each fluid actuator 70 may be associated with either the intake valves 32 or the exhaust valves 34 of a particular engine cylinder 22 (referring to FIG. 2). Fluid lines 80 direct pressurized fluid from fluid rail 86 into the actuator chamber 76 of each fluid actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will also recognize that fluid supply system 79 may have a variety of different configurations and include a variety of different components. For example, fluid supply system 79 may include one or more check valves (not shown). A first check valve may be placed in parallel with directional control valve 88 between restrictive orifice 75 and fluid actuator 70. A second check valve may be placed in fluid line 85 between main gallery 83 and fluid rail 86. In addition, fluid supply system 79 may include a source of high pressure fluid. Fluid supply system 79 may also include a snubbing valve that controls the rate of fluid flow from fluid actuator 70 and a damping system, which may include an accumulator and a restricted orifice, that prevents pressure oscillations in actuator chamber 76 and fluid line 80.

As shown in FIGS. 1 and 2, engine system 10 includes a controller 100. Controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the current operating conditions of the engine and/or instructions received from an operator.

Controller 100 may control valve actuation assembly 44 by transmitting a signal, such as, for example, a current, to directional control valve 88. The transmitted signal may result in the selective opening and closing of directional control valve 88. If directional control valve 88 is a normally closed valve, the transmitted signal may open the valve to allow hydraulic fluid to flow to and/or from fluid actuator 70.

Figure 5:
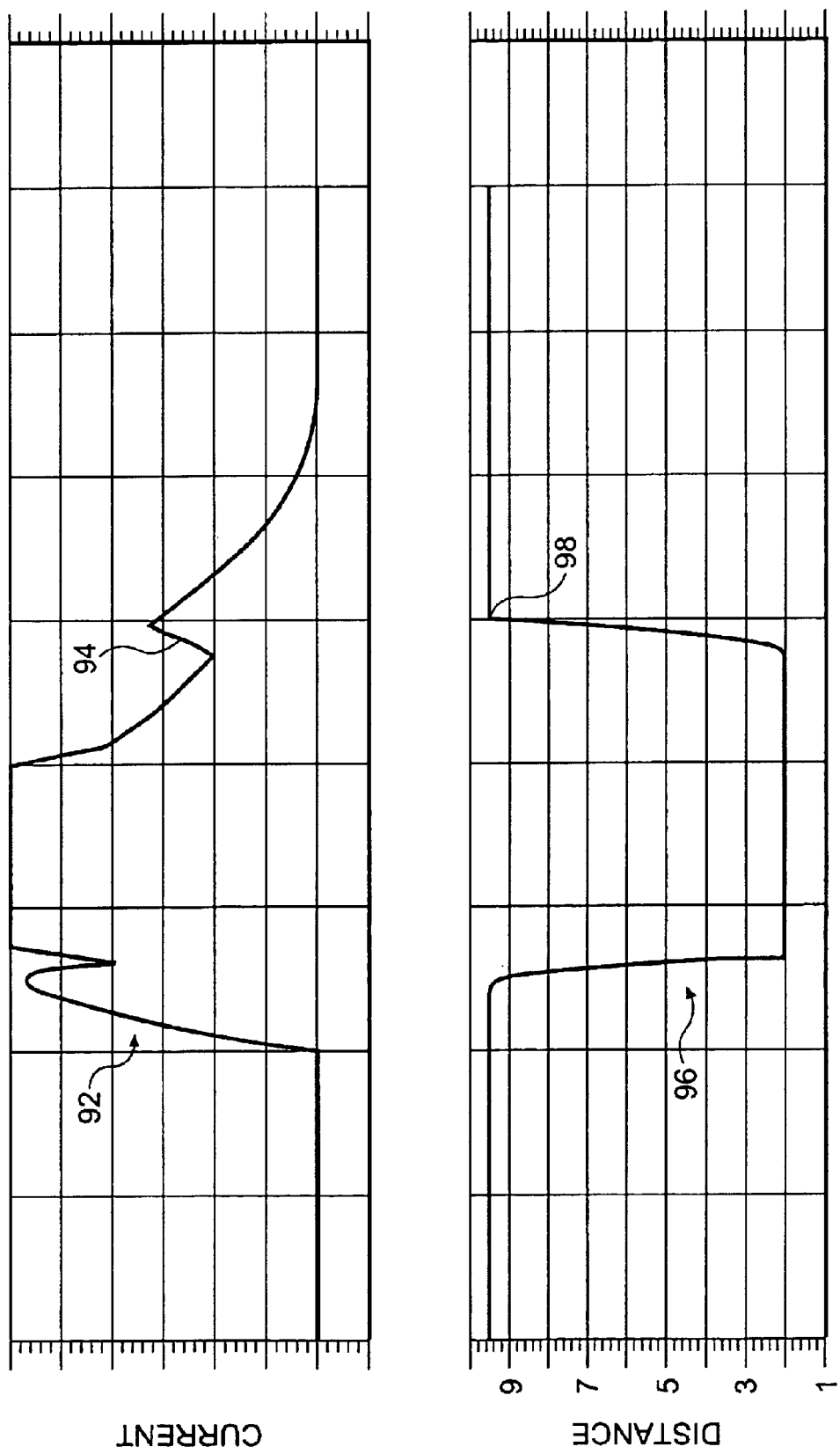
FIG. 5 is a graphic illustration of an exemplary relationship between a current applied to a valve and the resulting displacement of the valve.

If directional control valve 88 is a normally opened valve, the transmitted signal may close the valve to prevent fluid from flowing to and/or from fluid actuator 70. An exemplary signal 92 is illustrated in FIG. 5. As shown, signal 92 may be a current that causes a displacement 96 in directional control valve 88. One skilled in the art will recognize that type and form of the signal transmitted to directional control valve 88 will depend upon the operating characteristics of the particular directional control valve 88.

As illustrated in FIGS. 1–4, a series of sensors, which are described in greater detail below, may be operatively engaged with engine 20 and/or valve actuation assemblies 44. Each sensor is configured to monitor a particular parameter of the performance of engine 20 or valve actuation assemblies 44. One skilled in the art may recognize that alternative sensors may be used with engine system 10 to monitor the performance of engine 20 or valve actuation assemblies 44.

As illustrated in FIG. 2, controller 100 may include a current sensor 101. Current sensor is configured to monitor the current applied to directional control valve 88. Current sensor 101 may be any type of sensor readily apparent to one skilled in the art as capable of sensing the magnitude of a current. It should be understood that current sensor 101 may be part of controller 100 or current sensor 101 may be a separate sensor positioned at any appropriate location.

As also shown in FIG. 1, at least one engine sensor 18 is operatively connected with engine 20. Engine sensor 18 may be any type of sensor commonly used to monitor engine performance. For example, engine sensor 18 may be configured to measure one or more of the following: a rotational speed of the engine, a delivered torque of the engine, a temperature of the engine, a pressure within one or more of cylinders 22, and a rotational angle of crankshaft 27.

As further shown in FIG. 1, an intake sensor 16 may be disposed in intake passageway 13. Intake sensor 16 may be configured to sense the pressure of the intake air and/or the mass flow rate of the intake air. Intake sensor 16 may be any type of sensor readily apparent to one skilled in the art as capable of sensing these types of parameters and may be disposed at any point along intake passageway 13.

As further shown in FIG. 1, a turbocharger sensor 17 may be operatively connected with turbocharger 12. Turbocharger sensor 17 may be configured to sense the speed of the turbocharger. Turbocharger sensor 17 may also be configured to any other operational parameter of turbocharger 12.

As shown in FIG. 3, an actuator sensor 77 may be positioned proximate fluid actuator 70. Actuator sensor 77 may be configured to monitor fluid actuator 70 to detect movement. For example, actuator sensor 77 may be a magnetic sensor, such as, for example, a LVDT sensor, that senses movement of one or both of actuator rod 78 or actuator piston 74. One skilled in the art may recognize that other types of sensors, such as, for example, a Hall effect sensor, may be used to detect movement of fluid actuator 70.

As illustrated in FIG. 4, a fluid sensor 91 may be operatively engaged with fluid supply system 79. Fluid sensor 91 may be configured to sense a pressure and/or temperature that is representative of the pressure and/or temperature of the hydraulic fluid supplied to fluid actuator 70. Fluid sensor 91 may be operatively engaged with fluid supply system 79 at any point within fluid supply system 79. For example, fluid sensor 91 may be disposed in actuator chamber 76, fluid line 80, or fluid rail 86. In addition, multiple fluid sensors 91 may be engaged with fluid supply system 79 to sense a pressure and/or temperature that is representative of the fluid within fluid supply system 79 at ay of several different locations.

In addition, a fluid sensor 90 may be operatively engaged with main gallery 83. Fluid sensor 90 may be configured to sense one or more parameters of the fluid within main gallery 83. For example, fluid sensor 90 may sense a pressure and/or temperature that is representative of the fluid within main gallery 83. Alternatively, multiple fluid sensors 90 may be operatively engaged with main gallery 83 to sense multiple representative pressures and/or temperatures of the fluid within main gallery 83.

Figure 6:
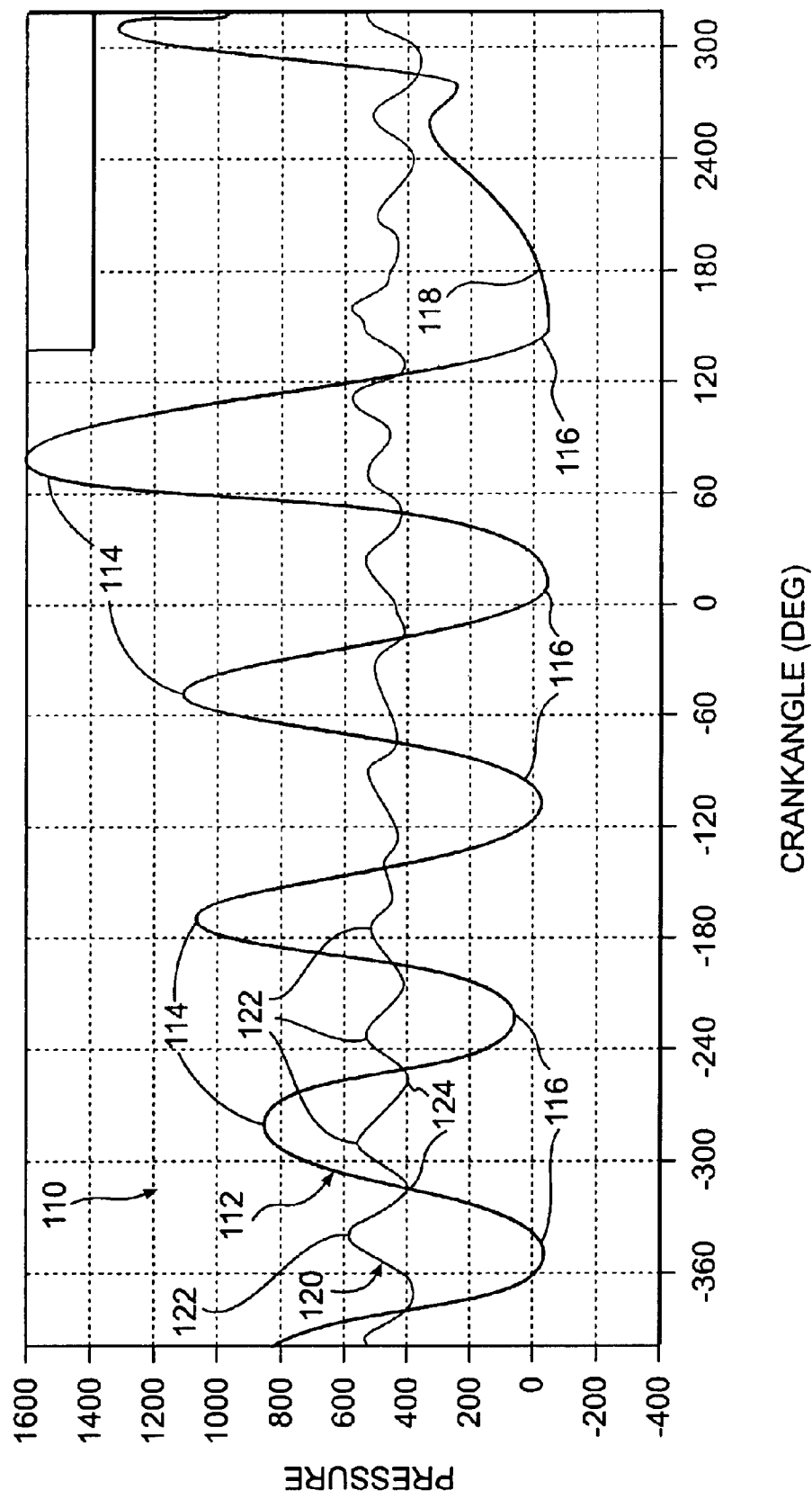
FIG. 6 is a graphic illustration of an exemplary relationship between a fluid system pressure, a gallery fluid pressure, and an engine crank angle.

Each sensor associated with engine system may provide information to controller 100. For example, fluid sensor 91 may provide an indication of the pressure in fuel rail 86 of fluid supply system 79 and fluid sensor 90 may provide an indication of the pressure in main gallery 83. FIG. 6 illustrates an exemplary fluid system pressure 112 and gallery pressure 122 as a function of engine crank angle.

Figure 7:
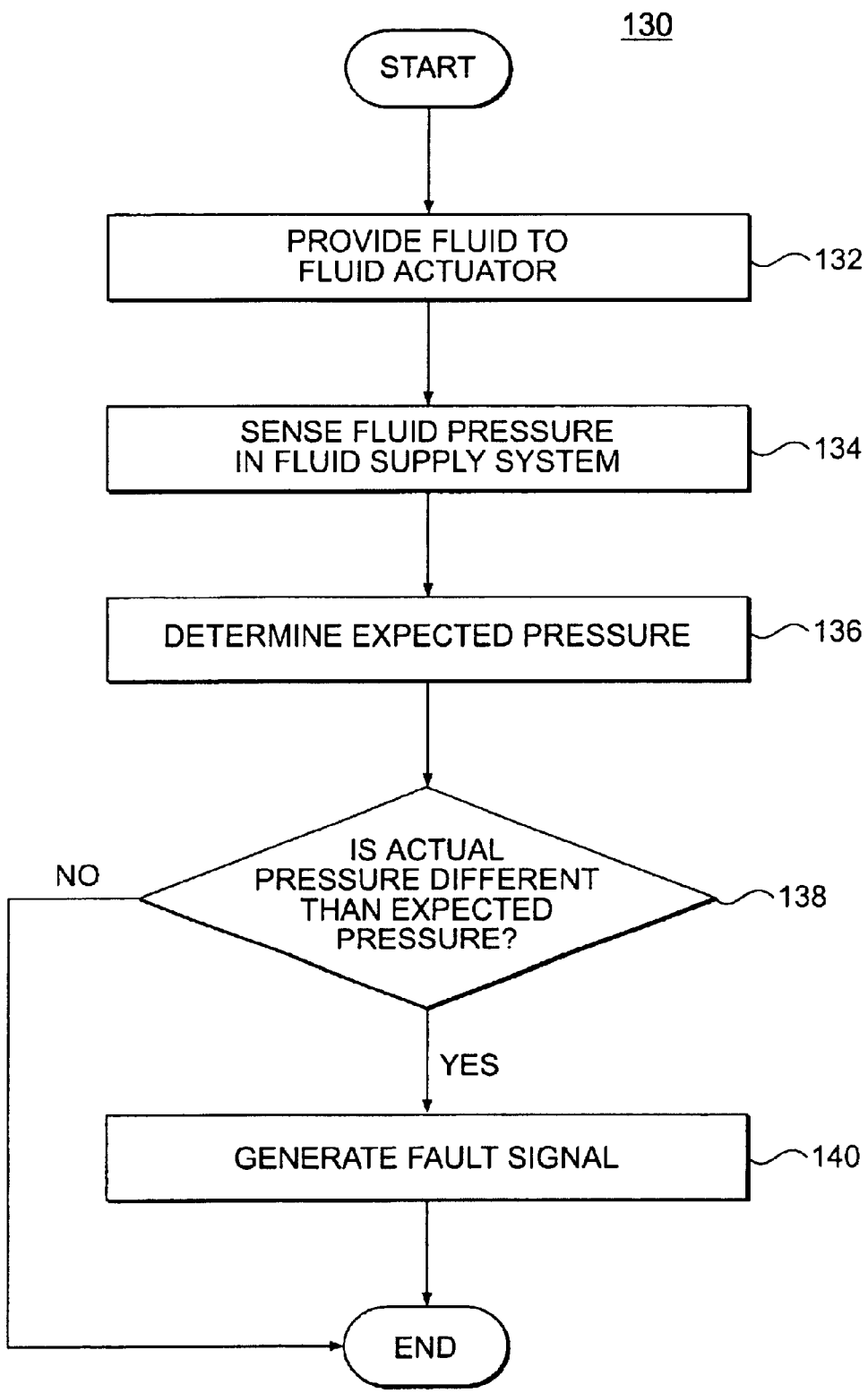
FIG. 7 is a flowchart illustrating a method of monitoring the actuation of an engine valve in accordance with an exemplary embodiment of the present invention.

Controller 100 may control the operation of engine system 10 based on the information provided by the sensors. In addition, controller 100 may monitor the operation of engine system 10 based on the information provided by the sensors. Controller 100 may also identify any potential problems in the operation of engine system 10 based on the information provided by the sensors. An exemplary method 130 of monitoring the actuation of the engine valves is illustrated in FIG. 7 and is described in greater detail below.

Industrial Applicability

Controller 100 may operate each valve actuation assembly 44 to selectively implement a late intake Miller cycle for each cylinder 22 of engine 20. Under normal operating conditions, implementation of the late intake Miller cycle will increase the overall efficiency of the engine 20. Under some operating conditions, such as, for example, when engine 20 is cold, controller 100 may operate engine 20 on a conventional diesel cycle.

When engine 20 is operating under normal operating conditions, controller 100 implements a late intake Miller cycle by selectively actuating fluid actuator 70 to hold intake valve 32 open for a first portion of the compression stroke of piston 24. This may be accomplished by transmitting a signal to close control valve 82 and to open each directional control valve 88. This allows pressurized fluid to flow from main gallery 83 through restrictive orifice 75 to fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. When actuator chamber 76 is filled with fluid and rocker arm 64 returns intake valves 32 from the open position to the closed position, actuator rod 78 will engage end 68 of rocker arm 64.

When actuator chamber 76 is filled with fluid, directional control valve 88 may be closed. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, fluid actuator 70 will hold intake valves 32 in the open position, independently of the action of cam assembly 52.

Controller 100 may close intake valves 32 by opening directional control valve 88 to provide an escape path for the fluid trapped in actuator chamber 76. The force of springs 56 forces the fluid from actuator chamber 76 and into fluid rail 86. The introduction of the fluid into the fluid rail 86 will increase the pressure of the fluid in fluid rail 86.

The release of fluid from actuator chamber 76 allows actuator piston 74 to move within actuator cylinder 72. This allows rocker arm 64 to pivot so that intake valves 32 are moved to the closed position. A snubbing valve may restrict the rate at which fluid exits actuator chamber 76 to reduce the velocity at which intake valves 32 are closed. This may prevent valve elements 40 from being damaged when closing intake ports 36.

When engine 20 is operating in a conventional diesel cycle, a greater compression ratio will be experienced within each cylinder 22. A prolonged exposure to this increased pressure condition may damage engine 20. This damage may be avoided by identifying a condition where fluid actuator 70 is not properly functioning to implement the late intake Miller cycle.

A variable valve actuation system, such as that described above, may encounter any one of several failure modes that may result in a prolonged exposure to excessive pressures. For example, fluid actuator 70 associated with a single cylinder 22 may fail or fluid actuators 70 associated will all cylinders 22 in engine 20 may fail. In addition fluid actuators 70 may encounter a partial failure, such as where intake valve 32 does not completely close or where intake valve 32 experiences a partial lift or a leaky lift.

Controller 100 may be programmed to identify one or more of these failure modes by monitoring and interpreting at least one parameter that is affected by the operation of fluid actuator 70. Controller 100 analyzes the information provided by the sensors to identify a situation where the engine should be operating on a Miller cycle, but is actually operating on a conventional diesel cycle or when intake valves 32 are not functioning properly. This situation may be experienced due to a failure in one or more components of valve actuation assembly 44. When such a situation is identified, controller 100 may generate a fault signal. In response to the fault signal, controller 100 may generate a warning, such as, for example, illuminating a warning light, that prompt maintenance is required. Controller 100 may also terminate or reduce the amount of fuel injected to the particular cylinder or cylinders that are experiencing a valve actuation assembly 44 failure.

Controller 100 may identify this situation through a variety of techniques, examples of which are described in greater detail below. It should be understood, however, that many combinations, variations, and alternatives to the described techniques may be apparent to one skilled in the art and are considered to be within the scope of the present invention.

For example, controller 100 may monitor the current applied to directional control valve 88 through current sensor 101. As shown in FIG. 5, a current inflection 94 is experienced when directional control valve 88 reaches a closed position 98. The current inflection 94 is caused by a change in the resistance and/or inductance of directional control valve 88 when the valve reaches the closed position. If controller 100 transmits a signal to directional control valve 88 to either open or close the valve and no current inflection 94 is detected, controller 100 may identify this condition as a possible failure of directional control valve 88. A failure of the directional control valve 88 may translate to a failure of fluid actuator 70. If fluid actuator 70 is not functioning properly, a Miller cycle may not be implemented. Accordingly, controller should issue a warning that maintenance may be required and/or terminate future fuel injections to the particular cylinder 22.

Controller 100 may also monitor one or more engine parameters through engine sensor 18. For example, controller 100 may monitor the rotational speed of crankshaft 27, the torque exerted by engine 20, and/or the pressure within one or more cylinders 22. An increase in one or more of these parameters may indicate that engine 20 is operating in a conventional diesel cycle. If controller 100 senses an unexpected increase in one of these parameters when engine 20 should be operating in a Miller cycle, controller 100 should issue a warning that maintenance may be required and/or terminate future fuel injections to the particular cylinder 22.

Controller 100 may also monitor and analyze a combination of engine parameters to identify when the Miller cycle is not implemented. For example, controller 100 may monitor the pressure within cylinder 22 as a function of the crankshaft 27 angle and/or piston 24 position. Controller 100 may also determine an estimated cylinder pressure as a function of piston position for the current engine operating conditions. Controller 100 may compare the monitored cylinder pressure to the predicted cylinder pressure at different piston positions. A significant difference between the predicted cylinder pressure and the monitored cylinder pressure may indicate that valve actuator 70 is not functioning properly. A situation where the monitored cylinder pressure is significantly greater than the predicted cylinder pressure may be indicative of valve actuator 70 failing to implement the Miller cycle. Alternatively, a situation where the monitored cylinder pressure is significantly less than the predicted cylinder pressure may be indicative of valve actuator 70 failing to release intake valve 32. The failure of valve actuator 70 to release intake valve 32 may lead to inadequate compression ratios for auto ignition and/or to an increase in unburned hydrocarbons being dumped to the environment. Accordingly, if controller 100 detects either situation, controller 100 may issue a warning that maintenance is required and/or terminate future fuel injections to the particular chamber 22.

Controller 100 may also monitor the motion of actuator rod 78 and/or actuator piston 74. When engine 20 is operating in a Miller cycle, hydraulic fluid will enter actuator chamber 76 to move actuator piston 74 and actuator rod 78. Accordingly, if engine 20 should be operating in a Miller cycle and controller 100 does not detect motion of either actuator piston 74 or actuator rod 78, controller 100 should issue a warning that maintenance may be required and/or terminate future fuel injections to the particular cylinder 22.

Controller 100 may also monitor the pressure of the hydraulic fluid within actuator chamber 76 or within fluid system 79 through fluid sensor 90. When engine 20 is operating in a Miller cycle, the pressure of the fluid within actuator chamber 76 will increase when actuator rod 78 engages end 68 of rocker arm 64. The pressure of the fluid within fluid supply system 79 will uniformly fluctuate as fluid flows into and out of actuator chamber 76. Accordingly, if engine 20 should be operating in a Miller cycle and controller 100 determines that the pressure within actuator chamber 76 and/or fluid supply system 79 remains constant, controller 100 should issue a warning that maintenance may be required and/or terminate future fuel injections to the particular cylinder 22.

The flowchart of FIG. 7 illustrates an exemplary method 130 of monitoring the fluid pressure within fluid system 79 to identify a valve actuation assembly failure. As described above, controller 100 governs the positions of control valve 82 and directional control valves 88 to selectively provide fluid to fluid actuator 70 (step 132). To implement the late intake Miller cycle, control valve 82 is closed and directional control valves 88 are selectively operated to delay the closing of the associated intake valves 32.

Pressure sensor 91 senses a pressure indicative of the pressure of the fluid within fluid supply system 79 (step 134). Pressure sensor 91 may sample the pressure of the fluid at one or more pre-selected timings during the operating cycle of engine 20 to thereby monitor the operation of the fluid actuator 70 associated with each engine cylinder. The timing of the pressure sampling may be driven by engine sensor 18 that determines the crank angle of the crankshaft 27. In this manner, the timing of the pressure sampling may be related to the operating cycle of the engine. One skilled in the art will recognize that the timing of the pressure sampling may be driven by a sensor connected to another engine component, such as, for example, a cam shaft (not shown) in cam assembly 52.

As shown in FIG. 6, when a late-intake type Miller cycle is being implemented, fluid system pressure 112 in fluid rail 86 will fluctuate between a series of pressure minimums 116 and a series of pressure peaks 114. Pressure peaks 114 are caused by the release of fluid from actuator chamber 76 for each fluid actuator 70 associated with each set of intake valves 32. Accordingly, when the Miller cycle is implemented, fluid rail 86 will experience a successive series of pressure peaks 114 as each fluid actuator 70 releases the corresponding intake valve 32. The absence of an expected pressure peak 114 at a known sample point, such as, for example, a pressure trough 118, will therefore indicate a potential failure in one or more fluid actuators 70.

Controller 100 may control the pressure sampling of pressure sensor 91 to coincide with the expected pressure peaks 114 associated with the release of fluid from each fluid actuator 70. Controller 100 may estimate the location of the expected pressure peaks 114 based on the timing of the end of the signal to the particular directional control valve 88 and the current speed of the engine. For example, controller 100 may expect the pressure peak to occur a certain number of rotational degrees after the end of the current signal to directional control valve 88. The location of the pressure peak 114, in terms of a number of rotational degrees (X) from the end of the signal may be calculated by the following exemplary formula:

$$X = 28° + 0.02(\text{Engine Speed})$$

The temperature of the fluid in fluid rail 86 may also impact the location of the pressure peak 114 relative to the end of the directional control valve signal. When the fluid is cold, the viscosity of the fluid will be relatively high and the pressure peak 114 will be further from the end of signal than when the fluid is warm and the fluid viscosity is relatively low. Accordingly, controller 100 may further adjust the estimated location of the pressure peak 114 based on a sensed temperature of the fluid within fluid rail 86.

Alternatively, instead of calculating the location of the expected pressure peak 114, controller 100 may store a map, or other similar data structure, that defines the location of the expected pressure peak 114. The map may define the location of the expected pressure peak 114 as a function of the end of signal to directional control valve 88, the engine speed, and the fluid temperature. The map may also take into account the location of the valve actuator 70 relative to pressure sensor 91. Controller 100 may access the map using the current engine speed and fluid temperature to estimate the location of the expected pressure peak 114 for each engine cylinder.

Controller 100 may control pressure sensor 91 to sample the pressure of the fluid in fluid rail 86 at the engine crank angle corresponding to the expected location of pressure peak 114 associated with each cylinder of engine 20. As the sampling may be driven by the crank angle sensor 18, which may provide the crankshaft angle in increments, such as, for example, in increments of 10°, controller 100 may sample the fluid rail 86 pressure at the nearest possible crankshaft angle. Controller 100 may also sample the fluid rail pressure for each cylinder over multiple engine cycles to determine a maximum fluid rail 86 pressure or an average fluid rail 86 pressure.

Controller 100 will also estimate the magnitude of the expected pressure peak (step 136). The magnitude of the expected pressure peak 114 may be determined as a function of the pressure of the fluid in main gallery 83. As shown in FIG. 6, the gallery fluid pressure 120 will also fluctuate between pressure minimums 124 and pressure peaks 122. Sensor 90 may sense the pressure of the fluid in main gallery 83. Under normal Miller cycle operating conditions, the pressure peaks 114 associated with fluid rail 86 will be greater than the pressure peaks 122 associated with main gallery 83.

Controller 100 may compare the sensed pressure to the expected pressure (step 138). For example, controller 100 may compare the sensed pressure of the fluid rail 86 to a maximum sensed pressure in main gallery 83. When fluid actuator 70 is operating normally, the peak pressure 114 in the fluid rail 86 will be greater than the maximum sensed pressure in main gallery 83, or at least greater than a certain percentage or a certain multiplier of the maximum sensed pressure in main gallery 83. For example, the expected pressure may be 1.5 times the maximum sensed pressure in main gallery 83. If the fluid actuator 70 is not operating normally, the pressure in fluid rail 86 may not exceed the maximum sensed pressure in main gallery 83, or at least greater than a certain percentage of the maximum sensed pressure in main gallery 83, such as illustrated by a trough 118 (referring to FIG. 6).

If controller 100 determines that fluid rail 86 is experiencing a pressure trough 118 instead of a pressure peak 114, i.e. the actual pressure 114 is substantially different from the expected peak pressure 114, controller 100 may generate a fault signal (step 140). The fault signal may be generated for a particular cylinder or for all cylinders. Controller 100 may determine the affected cylinder or cylinders based on the crank angle corresponding to the pressure trough 118. As one skilled in the art will recognize, fluid actuator 70 associated with each cylinder will release fluid to fluid rail 86 between a certain range of crank angles for each engine cycle.

In response to the generation of a fault signal is generated, the engine may be derated to protect the engine from experiencing excessive compression ratios. For example, the fuel injections to the troubled cylinder or all cylinders may be reduced or terminated. In addition, a warning light may be illuminated to notify an operator that maintenance is required.

In addition, if the Miller cycle is disabled, such as by opening control valve 82, the expected pressure in fluid rail 86 will be relatively constant. If fluid rail 86 is experiencing pressure peaks 114 when the Miller cycle is supposedly disabled, controller 100 may identify a potential problem with the valve actuation system and generate a fault signal. In this case, the problem may be a failure or improper functioning of control valve 82.

Controller 100 may also be programmed to avoid falsely detecting a fluid actuator failure. For example, controller 100 may maintain a count of the number of pressure samples that are less than the expected pressure. When the count exceeds a certain limit, the fault signal may be generated. Controller 100 may be further programmed to reduce the count if a subsequent pressure sample is at or near the expected pressure.

In addition, if controller 100 identifies a potential problem with a particular fluid actuator 70, controller 100 may increase the number of pressure samples taken for the particular fluid actuator 70. In addition, controller 100 may adjust the end of the signal to the particular directional control valve 88 so that the expected pressure peak 114 will align with a pressure sample point. In this manner, controller 100 may ensure that fluid rail 86 is not experiencing the expected pressure peak 114 before generating the fault signal.

One skilled in the art will recognize that the fluid rail pressure may be monitored in other manners to identify valve actuation failures. For example, several pressure samples at different crank angles may be taken for each cylinder. Based on these samples, an actual pressure pattern may be established. The actual pressure pattern may be compared to an expected pressure pattern that is stored in memory 101 of controller 100. The comparison may be performed, for example, by a neural network. If the actual pressure pattern is sufficiently different from the expected pressure pattern, controller 100 may generate the fault signal.

The flow of intake air to engine 20 may also be monitored to identify problems in the valve actuation system. For example, controller 100 may monitor the flow of intake air into engine 20 through intake sensor 16. An unexpected increase in either the intake air pressure or the intake air mass flow may indicate that engine 20 has switched from the Miller cycle to a conventional diesel cycle. Accordingly, if engine 20 should be operating on the Miller cycle and controller 100 identifies an unexpected increase in either the intake air pressure of the intake air mass flow rate, controller 100 should issue a warning that maintenance may be required and/or terminate future fuel injections to the particular cylinder 22.

Controller 100 may also monitor the performance of turbocharger 12 through turbocharger sensor 17. An unexpected increase in the speed of turbocharger 12 may indicate that engine 20 has switched from the Miller cycle to a conventional diesel cycle. Accordingly, if engine 20 should be operating on the Miller cycle and controller 100 identifies an unexpected increase in the speed of turbocharger 12, controller 100 should issue a warning that maintenance may be required. Controller 100 may also take corrective action to prevent damage to engine 20. For example, controller 100 may reduce the amount of fuel delivered to each cylinder 22. In addition, controller 100 may modify the performance of turbocharger to reduce the pressure of the intake air. For example, controller 100 may adjust the position of a wastegate.

As will be apparent from the foregoing description, the present invention provides a method and system for monitoring a variable valve actuation system. The described system may identify a potential failure in one or more components in the variable valve actuation system. The controller may identify a condition where the engine should be operating in a Miller cycle, but the performance characteristics of the engine indicate that the engine is actually operating in a conventional diesel cycle. When this condition is identified, the controller may issue a warning indicating that the engine valve actuation system requires maintenance to prevent further damage to the engine. The controller may also take corrective action such as stopping fuel delivery or reducing the quantity of fuel delivered to one or all of the combustion cylinders or actuating a wastegate or similar device to reduce pressure of air delivered to the combustion chamber.

The present invention provides an on-board diagnostic tool that identifies potential problems before substantial engine damage is incurred. The controller of the present invention may identify a situation where the fluid actuators associated with one or more cylinders are not functioning properly. For example, the controller may identify a situation where one or more fluid actuators fail to engage the corresponding intake valve to implement the late intake Miller cycle. In addition, controller may identify a situation where the fluid actuator does not allow the corresponding intake valve to completely close or where the corresponding intake valve experiences a partial lift or a leaky lift. When such a failure mode is identified, the controller takes preventive action to avoid further engine damage.

It will be apparent to those skilled in the art that various modifications and variations can be made in the engine valve actuation system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An engine valve actuation system, comprising:
    an intake valve moveable between a first position where the intake valve prevents a flow of fluid relative to the intake valve and a second position where the intake valve allows a flow of fluid relative to the intake valve;
    a cam assembly configured to move the intake valve between the first position and the second position;
    a fluid actuator having a chamber and being adapted to selectively prevent the intake valve from moving in response to the cam assembly to the first position;
    a fluid supply system adapted to deliver fluid to the chamber of the actuator;
    a pressure sensor operatively engaged with the fluid supply system and adapted to sense the pressure of the fluid within the fluid supply system; and
    a controller adapted to receive the sensed pressure of the fluid within the fluid supply system, to determine an expected pressure of the fluid within the fluid supply system, to identify when the sensed pressure deviates from the expected pressure, and to generate a responsive fault signal.

2. The system of claim 1, wherein the fluid supply system includes a fluid rail and the pressure sensor is operatively engaged with the fluid rail.

3. The system of claim 1, further including:
    a gallery in fluid connection with the fluid supply system; and
    a second pressure sensor operatively engaged with the gallery and adapted to sense the pressure of the fluid within the gallery.

4. The system of claim 3, wherein the controller determines the expected pressure as a function of a maximum sensed pressure of the fluid within the gallery.

5. The system of claim 4, wherein the controller generates a warning when the sensed pressure is less than the maximum sensed pressure of the fluid within the gallery.

6. The system of claim 1, wherein the pressure sensor senses the pressure of the fluid in the fluid supply systems at a plurality of predetermined timings.

7. The system of claim 6, wherein the controller identifies a peak pressure in the fluid supply system based on the sensed pressures of the fluid in the fluid supply system.

8. The system of claim 6, wherein the predetermined timings are selected to coincide with an expected maximum pressure being experienced in the fluid supply system.

9. The system of claim 8, wherein the predetermined timings are determined as a function of an engine speed and an end of a signal transmitted to the actuator.

10. The system of claim 8, further including a temperature sensor adapted to sense the temperature of the fluid within the fluid supply system and an engine speed sensor adapted to sense the speed of an engine.

11. The system of claim 10, wherein the predetermined timings are adjusted based on the sensed temperature of the fluid within the fluid supply system.

12. The system of claim 11, wherein the predetermined timings are determined as a function of an engine speed, an end of a signal transmitted to the actuator, and the sensed temperature of the fluid within the fluid supply system.

13. The system of claim 10, wherein the controller includes a memory adapted to store a map that defines an expected pressure pattern for the fluid supply system as a function of the fluid supply system temperature, the speed of the engine, and the end of the signal transmitted to the fluid actuator.

14. The system of claim 13, wherein the controller compares an actual pressure pattern based on the sensed pressures in the fluid supply system to an expected pressure pattern defined by the map and generates a warning signal when the actual pressure pattern is substantially different from the expected pressure pattern.

15. The system of claim 8, wherein the controller maintains a count representing a number of times that the sensed pressure at the predetermined timings deviates from the expected pressure at the predetermined timings.

16. The system of claim 15, wherein the controller generates a warning signal when the count exceeds a predetermined limit.

17. The system of claim 15, wherein the controller decreases the count when the sensed pressure at a particular predetermined timing is at or near the expected pressure for the particular predetermined timing.

18. A method of controlling an engine valve, comprising:
operating a cam assembly to move an intake valve between a first position where the intake valve prevents a flow of fluid and a second position where the intake valve allows a flow of fluid;
providing fluid through a fluid supply system to a fluid actuator to selectively prevent the intake valve from moving in response to the cam assembly to the first position;
sensing a pressure of the fluid within the fluid supply system;
determining an expected pressure of the fluid within the fluid supply system;
identifying when the sensed pressure of the fluid within the fluid supply system deviates from the expected pressure of the fluid within the fluid supply system; and
generating a fault signal when the sensed pressure deviates from the expected pressure for a predetermined period of time.

19. The method of claim 18, further including derating the engine in response to the fault signal.

20. The method of claim 18, further including sensing the pressure of fluid within a gallery adapted to supply fluid to the fluid supply system.

21. The method of claim 20, wherein the expected pressure is determined as a function of a maximum sensed pressure of the fluid within the gallery.

22. The method of claim 21, further including generating a fault signal when the sensed pressure is less than the maximum sensed pressure of the fluid within the gallery.

23. The method of claim 18, wherein the pressure of the fluid in the fluid supply system is sensed at a plurality of predetermined timings.

24. The method of claim 23, further including identifying a peak pressure in the fluid supply system based on the sensed pressures of the fluid in the fluid supply system.

25. The method of claim 23, further including selecting the predetermined timings to coincide with an expected maximum pressure being experienced in the fluid supply system.

26. The method of claim 25, further including:
sensing a speed of an engine; and
transmitting a signal to control the fluid actuator.

27. The method of claim 26, wherein the predetermined timings are determined as a function of the speed of the engine and the end of the signal transmitted to the fluid actuator.

28. The method of claim 26, further including sensing the temperature of the fluid within the fluid supply system and wherein the predetermined timings are determined as a function of the speed of the engine, an end of the signal transmitted to the actuator, and the sensed temperature of the fluid within the fluid supply system.

29. The method of claim 26, further including:
sensing a temperature of the fluid within the fluid supply system;
identifying an actual pressure pattern based on the sensed pressures of the fluid within the fluid supply system;
identifying an expected pressure pattern for the fluid supply system from a map defining the expected pressure of the fluid supply system as a function of the fluid temperature, the speed of the engine, and the end of the signal transmitted to the fluid actuator.

30. The method of claim 29, further including generating a fault signal when the actual pressure pattern is substantially different from the expected pressure pattern.

31. The method of claim 25, further including:
sensing a temperature of the fluid within the fluid supply system; and
adjusting the predetermined timings based on the sensed temperature of the fluid within the fluid supply system.

32. The method of claim 23, further including maintaining a count representing a number of times that the sensed pressure at the predetermined timings deviates from the expected pressure at the predetermined timings.

33. The method of claim 32, further including generating a fault signal when the count exceeds a predetermined limit.

34. The method of claim 32, further including decreasing the count when the sensed pressure at a selected predetermined timing is at or near the expected pressure for the selected predetermined timing.

35. An engine, comprising:

an engine block defining at least one cylinder;

a piston slidably disposed within the at least one cylinder;

an intake valve moveable between a first position where fluid is prevented from flowing relative to the intake valve and a second position where fluid is allowed to flow relative to the intake valve;

a cam assembly adapted to move the intake valve between the first position and the second position;

a fluid actuator having a chamber and being adapted to selectively prevent the intake valve from moving in response to the cam assembly to the first position;

a fluid supply system adapted to deliver fluid to the chamber of the actuator;

a pressure sensor operatively engaged with the fluid supply system and adapted to sense the pressure of the fluid within the fluid supply system; and a controller adapted to receive the sensed pressure of the fluid within the fluid supply system, to determine an expected pressure of the fluid within the fluid supply system, to identify when the sensed pressure deviates from the expected pressure, and to generate a responsive fault signal.

36. The engine of claim 35, further including:

a crankshaft operatively connected to the piston; and a sensor adapted to sense a rotational position of the crankshaft.

37. The engine of claim 35, wherein the fluid supply system includes a fluid rail and the pressure sensor is operatively engaged with the fluid rail.

38. The engine of claim 35, further including:

a gallery in fluid connection with the fluid supply system; and a second pressure sensor operatively engaged with the gallery and adapted to sense the pressure of the fluid within the gallery.

39. The engine of claim 38, wherein the controller determines the expected pressure as a function of a maximum sensed pressure of the fluid within the gallery.

40. The engine of claim 39, wherein the controller generates a fault signal when the sensed pressure is less than the maximum sensed pressure of the fluid within the gallery.

41. The engine of claim 35, wherein the pressure sensor senses the pressure of the fluid in the fluid supply systems at a plurality of predetermined timings.

42. The engine of claim 41, wherein the controller identifies a peak pressure in the fluid supply system based on the sensed pressures of the fluid in the fluid supply system.

43. The engine of claim 41, wherein the predetermined timings are selected to coincide with an expected maximum pressure being experienced in the fluid supply system.

44. The engine of claim 43, wherein the predetermined timings are determined as a function of an engine speed and an end of a signal transmitted to the actuator.

45. The engine of claim 43, further including a temperature sensor adapted to sense the temperature of the fluid within the fluid supply system and an engine speed sensor adapted to sense the speed of an engine.

46. The engine of claim 45, wherein the predetermined timings are adjusted based on the sensed temperature of the fluid within the fluid supply system.

47. The engine of claim 45, wherein the predetermined timings are determined as a function of an engine speed, an end of a signal transmitted to the actuator, and the sensed temperature of the fluid within the fluid supply system.

48. The engine of claim 45, wherein the controller includes a memory adapted to store a map that defines an expected pressure pattern for the fluid supply system as a function of the fluid supply system temperature, the speed of the engine, and the end of the signal transmitted to the fluid actuator.

49. The engine of claim 48, wherein the controller compares an actual pressure pattern based on the sensed pressures in the fluid supply system to an expected pressure pattern defined by the map and generates a warning signal when the actual pressure pattern is substantially different from the expected pressure pattern.

50. The engine of claim 43, wherein the controller maintains a count representing a number of times that the sensed pressure at the predetermined timings deviates from the expected pressure at the predetermined timings.

51. The engine of claim 50, wherein the controller generates a fault signal when the count exceeds a predetermined limit.

52. The engine of claim 50, wherein the controller decreases the count when the sensed pressure at a particular predetermined timing is at or near the expected pressure for the particular predetermined timing.

* * * * *